July 16, 1929. E. GIEBE ET AL 1,720,659
METHOD FOR DETERMINING ELECTRICAL AXES IN CRYSTALS
Filed April 21, 1927
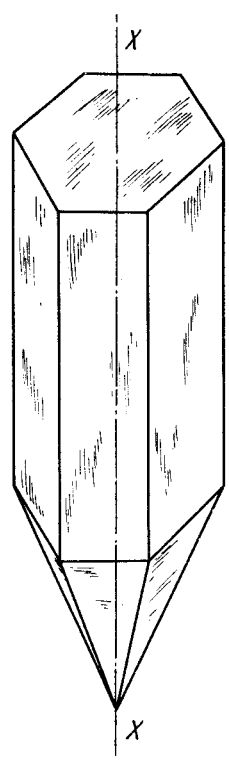
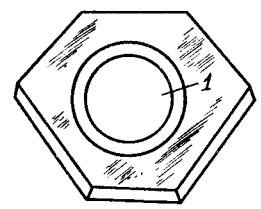
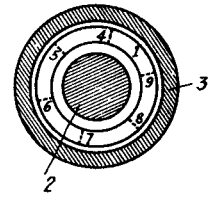
INVENTOR
ERICH GIEBE
ADOLF SCHEIBE
BY
ATTORNEY Patented July 16, 1929.

1,720,659

UNITED STATES PATENT OFFICE.

ERICH GIEBE AND ADOLF SCHEIBE, OF CHARLOTTENBURG, BERLIN, GERMANY, ASSIGNORS TO RADIO CORPORATION OF AMERICA, A CORPORATION OF DELAWARE.

METHOD FOR DETERMINING ELECTRICAL AXES IN CRYSTALS.

Application filed April 21, 1927, Serial No. 185,428, and in Germany April 24, 1926.

This invention relates to a crystal and more particularly to a piezo electric crystal and a method of determining the direction of electrical axes in the same.

For the purposes of frequency determination with piezo electric crystals and generally for the electrical excitation of such crystals, it is necessary to know with a maximum of accuracy the direction of the electrical axes of the crystal. For instance, if rods, plates, rings or the like are to be cut out of a quartz crystal, and if these shall be as free as feasible from stray oscillations and shall give a maximum of piezo electric effect, it is necessary to take into consideration with great correctness the direction of the electrical axes since even very slight deviations of the ground surface or cleave, from the true direction of the axis are liable to cause the production of secondary vibrations, whereby the chances of exciting the main vibrations are impaired.

It is an object of this invention to provide a method whereby the electrical axes of a crystal may be readily and accurately determined.

Now it is an easy thing to ascertain with optical means the sense or direction of the optical axis of quartz crystals. But for the determination of the electrical axes, all auxiliaries heretofore suggested and made available have been imperfect in their nature. According to the present invention, the direction of the electrical axis is determined in a novel manner, and this determination will be explained herein with the aid of the accompanying drawing in which:

Figure 1 is a perspective view of a crystal whose electrical axes are to be determined;

Figure 2 is a plate cut from the crystal in Figure 1 and,

Figure 3 is a view of an annular ring cut from the plate of Figure 2 placed between two electrodes.

A plate is first cut out of the quartz crystal in a direction at right angles to the optical axis. Figure 1 shows, for instance, a quartz crystal whose optical axis is indicated by the dotted line X—X. Figure 2 shows the plate that has been cut out of the crystal. Next a circular ring is cut out of the said plate. However, the position of this circular ring with reference to the plate is exactly marked by means of a marking or check line 1 extending over the ring and the plate. Next, the said ring, as shown in Figure 3, is placed between two electrodes 2 and 3. Between these electrodes, which are insulated from each other, there is then applied an alternating current field directed radially in all directions towards the outside, for instance, by applying an alternating potential of regulable frequency. On the circular ring, there is the part of the marking line indicated by 1. If the arrangement shown in Figure 3 is mounted inside a partially exhausted space, or a space filled with a rare gas, then a piezoelectric excitation takes place at a very definite frequency of the applied alternating field, indeed, an oscillation of this kind can be excited in such a manner that along the quartz ring three complete wave-lengths will arise. On the surface of the quartz ring there is incidentally produced a luminous action, to be more precise, at six points, namely, the six "penetration" or passage points of the electrical axes of the quartz crystal which shall be assumed to have positions as indicated by 4, 5, 6, 7, 8, 9. It is then easily possible to ascertain the angular deviation of the marking line from the neighboring penetration point of the electrical axis. All that is then still necessary to do is to replace the quartz ring into its relative position to the original quartz plate as resulting from Figure 2 and indicated by the marking line in order to show exactly the position of the electrical axis for the entire quartz strip according to Figure 1. After this, has been done, the further working of the quartz crystal with relation to the ascertained electrical axes can be done in a very accurate manner. It is then further possible, to cut rods, plates, rings or other forms out of the crystal, and in each of these the electrical axis and its position can be properly taken into consideration.

It is clear, therefore, that this method of determining the electrical axes of a crystal has certain distinct advantages over the ordinary method for determining the same, used by mineralogists, which depends upon the obtaining of a crystal having several truly plane surfaces from which the axes may be determined.

It often occurs that crystals are obtained whose planar surfaces are damaged to such an extent that their outlines are indistinguishable. In such cases, the mineralogical method of determining the axes cannot be made use of. On the other hand applicant's method of determining the axes may be readily utilized notwithstanding the fact that plane surfaces are lacking.

Then again even where crystals are obtained which seemingly have perfect plane boundaries yet, upon closer inspection of the crystal it is found that the planar surfaces are warped and cannot be depended upon for the accurate laying out of the axes of the crystal. Here again the method of determining the electrical axes disclosed herein presents the advantage that it is not necessary to have the original crystalline planes for the determination of the various axes of the crystal.

By the use of the method disclosed herein applicants have located the axes of a crystal within one degree of their true location.

Having described our invention, what we claim is:

1. The method of determining the electrical axes of a crystal which includes the step of exciting a portion of the crystal cut from the crystal to luminesce at its electrical axes noting the position of the axes and replacing the cut portion on the crystal.

2. The method of determining the electrical axes of a crystal which includes the step of cutting a plate at substantially right angles to the optical axis of the crystal, the step of cutting a ring shaped member from the plate, and the step of exciting said member so that a luminous effect manifests itself in said member at the places where the electrical axes cross it.

3. The method of determining the electrical axes of a crystal which includes the step of cutting a plate from a crystal, whose electrical axes are to be determined, at right angles to the optical axes of said crystal, the step of applying an alternating electrical field to said plate in an evacuated vessel, and the step of noting the direction of the electrical axes in the plate by the luminous phenomena resulting from the application of said field.

4. The method of determining the electrical axes of a crystal which includes the step of cutting a plate from a crystal, whose electrical axes are to be determined, at right angles to the optical axes of said crystal, the step of applying an alternating electrical field to said plate in an evacuated vessel, the step of noting the direction of the electrical axes in the plate by the luminous phenomena resulting from the application of said field, and the step of replacing said plate whose electrical axes have been noted back in its original position on said crystal.

5. The method of determining the electrical axes in a crystal which includes cutting a member from the crystal transversely to the optical axes of the crystal, exciting the member electrically, noting the places where luminous effects take place due to the excitation of the member and replacing the member on the crystal.

6. The method of determining the electrical axes in a crystal which includes cutting a member from the crystal transversely to the optical axes of the crystal, exciting the member electrically in a rarefied gaseous atmosphere, noting the places where luminous effects take place due to the excitation of the member and replacing the member on the crystal.

ERICH GIEBE.
ADOLF SCHEIBE.